United States Patent [19]

Rohrer

[11] 3,728,694

[45] Apr. 17, 1973

[54] THIN FILM FERROELECTRIC DEVICE

[75] Inventor: George Andrew Rohrer, Dallas, Tex.

[73] Assignee: Technovation, Inc., Grosse Ile, Mich.

[22] Filed: Sept. 28, 1970

[21] Appl. No.: 76,059

[52] U.S. Cl. ....................................340/173.2

[51] Int. Cl. ....................................G11c 11/22

[58] Field of Search....................................340/173.2

[56] References Cited

UNITED STATES PATENTS 3,142,044 7/1964 Kaufman ..........................340/173.2

OTHER PUBLICATIONS

RCA Technical Notes TN No. 822 3-17-69 "Reduction of Waiting Time Effects in Ferroelectrics" George W. Taylor pp. 1–3.

*Primary Examiner*—Terrell W. Fears
*Attorney*—Irving M. Weiner

[57] ABSTRACT

A ferroelectric device having a layer of stable ferroelectric potassium nitrate disposed between electrical contacts positioned on opposite surfaces of the ferroelectric layer. The ferroelectric layer has a thickness of less than 110 microns, and preferably falling within a range of from 100 angstrom units to 1000 angstrom units. The process of manufacturing the ferroelectric device includes the cooling of a layer of potassium nitrate by exposing the layer to a cold dry gas without quenching to form a stable ferroelectric layer.

5 Claims, 20 Drawing Figures

GEORGE ANDREW ROHRER
INVENTOR
By [signature]
ATTORNEY

GEORGE ANDREW ROHRER
INVENTOR
By [signature]
ATTORNEY

INVENTOR
GEORGE ANDREW ROHRER
By [signature]
ATTORNEY

INVENTOR
GEORGE ANDREW ROHRER
By Irving M. Weiner
ATTORNEY

INVENTOR
GEORGE ANDREW ROHRER

By

ATTORNEY

THIN FILM FERROELECTRIC DEVICE

The present invention relates to a ferroelectric device and a process of manufacturing such a ferroelectric device. In particular, the invention relates to the production of a high vacuum deposited thin film ferroelectric cell having a layer of Phase III potassium nitrate which is stable at ordinary room temperature and pressure.

SUMMARY OF THE INVENTION

The present invention provides a ferroelectric device including a ferroelectric potassium nitrate layer having a thickness of less than 110 microns. The ferroelectric device also includes electrical contacts disposed on opposite surfaces of the ferroelectric potassium nitrate layer.

The present invention also provides a process of manufacturing a ferroelectric device including the steps of forming a first electrical contact, and then forming over at least a portion of the first electrical contact a layer of potassium nitrate. The layer of potassium nitrate is cooled by exposing the layer to a cold dry predetermined gas, such as nitrogen, without quenching to form a stable layer of ferroelectric potassium nitrate. The process also includes the step of forming a second electrical contact over at least a portion of the stable layer of ferroelectric potassium nitrate.

The invention also provides a high vacuum deposited thin film of ferroelectric computer memory cell employing a stable potassium nitrate dielectric.

The inventive process results in the attaining of a ferroelectric device having a layer of Phase III potassium nitrate, which is the ferroelectric phase of potassium nitrate which is stable at ordinary room temperature and pressure.

DETAILED DESCRIPTION OF SOME PREFERRED EMBODIMENTS OF THE PRESENT INVENTION

The term ferroelectric is somewhat of a misnomer because in many ferroelectric materials no iron compound is involved. In many respects, however, the phenomenon of ferroelectrics is analogous to ferromagnetics; hence, the derivation of the term ferroelectric. The ferromagnetic-ferroelectric analogy is illustrated in the following Table 1.

TABLE 1

| FERROMAGNETIC | FERROELECTRIC |
|---|---|
| Ferromagnetic materials show a spontaneous magnetic polarization due to an alignment of magnetic dipoles. | Ferroelectric materials show a spontaneous electric polarization due to an alignment of ionic dipoles. |
| magnetic domain alignment | electric domain alignment |
| easy axis | easy axis |
| hard axis | hard axis |
| magnetic hysteresis B versus H loop | electric hysteresis P versus E loop |

A ferroelectric material exhibits a net electric dipole moment; i.e., when the material is in the ferroelectric state, the centers of positive and negative charge do not coincide. Three conditions which must be fulfilled for a crystalline material to exhibit ferroelectricity.

1. It must have a phase transition from a polar to a non-polar structure; or at least it must tend, with rising temperature, towards such a transition.
2. The polar phase must have a spontaneous polarization; that is, the unit cell must actually have a dipole moment, not only belong to a space group which is capable of such a moment.
3. The direction of the spontaneous polarization must be reversible by an applied electric field. This third condition is the most important one.

Figures 1, 2:
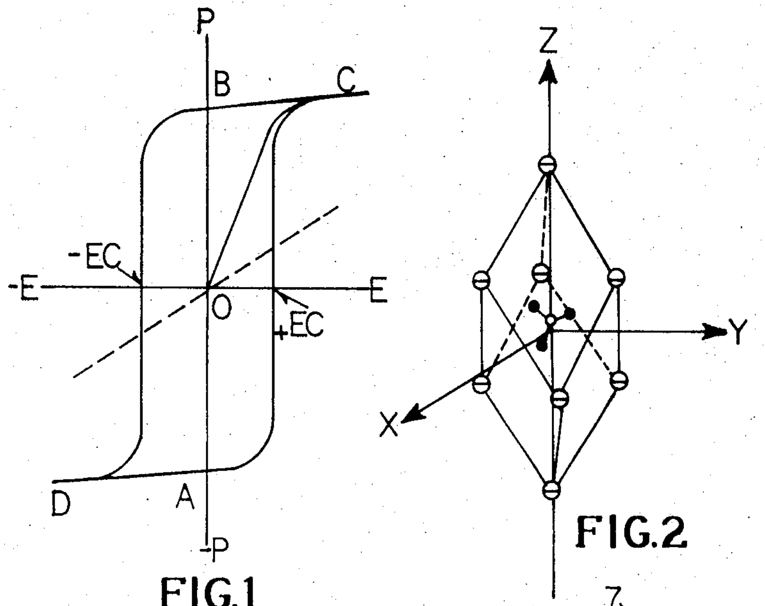
FIG. 1 illustrates a typical electric hysteresis loop showing a plot of polarization versus electric field.
FIG. 2 depicts a unit cell of Phase III potassium nitrate.

A typical plot of polarization versus electric field is shown in FIG. 1. This is an electric hysteresis loop, and it is analogous to a magnetic hysteresis loop. The electric field, $E_C$, corresponding to zero polarization is termed the coercive field. Unlike a normal dielectric (represented in FIG. 1 by the phantom straight line), the polarization for zero electric field is a non-zero value, $P_R$, called the remanent or spontaneous polarization. This remanent polarization is dependent upon the direction of the previous applied field; it can be either $P_R$ or $-P_R$ depending upon the direction of the last applied field. There are two well defined states for the material characterized by points A and B in FIG. 1. These materials are well suited as binary switching elements.

The hysteresis can be explained by the domain concept. Ferroelectric crystals are generally comprised of multiple twins. In each twin individual the spontaneous polarization is directed along a specific crystallographic direction. But the twin individuals are disposed at various angles to one another crystallographically; thus the polarization is in a different direction from one individual to the next. These individual regions are called ferroelectric domains. Consider the material to be at 0 in FIG. 1. There is no net polarization present in the material and there is no electric field applied. In this condition the domains are randomly oriented. Upon increasing the field in the positive direction, the number of positive domains increase at the expense of the negative domains. The domains become aligned in the direction of the applied field, thus aiding the applied field and further increasing the number of positive domains. With the field strength further increased, a situation will be reached when the polarization reaches the saturation value C, at which point all the domains are aligned in the direction of the applied field. This action is the initial polarization, and is represented by the portion of the curve from 0 to C. When the field is reduced to zero again, a few domains remain still aligned and hence a net polarization still remains. With the application of an electric field in the opposite direction, of equal strength, there will be a reverse domain growth until saturation is again reached. This action can be followed by the B to D portion of the curve. Decreasing the field back to zero will leave the material in state A with remanent polarization $-P_R$. Continued application of positive and negative fields will trace the loop A–C–B–D–A.

Various ferroelectric materials have been studied for their information storage capability. Although many materials exhibit the ferroelectric phenomenon, the predominant materials previously studied for memory application are barium titanate, potassium dihydrogen phosphate, tri-glycerin sulfate, and Phase III potassium nitrate. Phase III potassium nitrate exhibits a well-defined critical switching threshold.

FIG. 2 illustrates the rhombehedral structure of a unit cell of Phase III potassium nitrate. In FIG. 2, the blank circle at the center represents a nitrogen ion; the three solid circles surrounding the nitrogen ion are the oxygen ions; and the circles having medial horizontal lines therein are the potassium ions.

Figure 3:
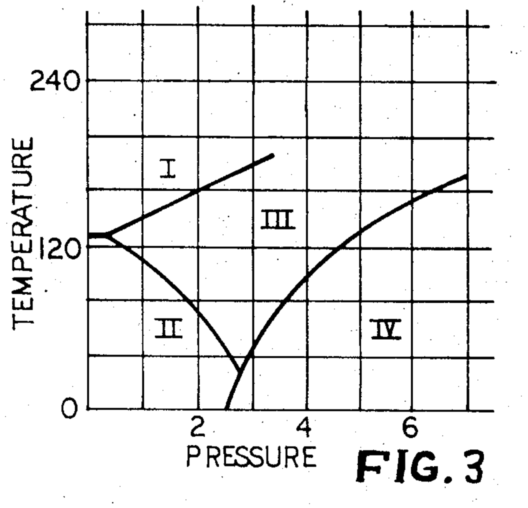
FIG. 3 illustrates a temperature-pressure phase diagram of bulk potassium nitrate.

The phase diagram for potassium nitrate is illustrated in FIG. 3 wherein the horizontal axis represents the pressure in kilobars and the vertical axis represents the temperature in degrees centigrade. Potassium nitrate exists in three forms. At temperatures above 130° C, potassium nitrate is in Phase I. This high temperature form has a rhombehedral structure, space group $D_{3d}^{6}$. At room temperatures, it exists in Phase II. This form has an orthorhombic structure, space group $D_{2h}^{16}$.

Potassium nitrate, when heated above 130° C, changes its crystalline structure from Phase II to Phase I. But when it is cooled, Phase I does not directly transform to Phase II, but instead it changes to the third form, Phase III, and further cooling yields Phase II. Phase III has been found to be ferroelectric, and it has a rhombehedral structure, space group $C_{3v}^{5}$, as illustrated in FIG. 2.

Previous studies involving bulk fused potassium nitrate ferroelectric capacitors indicate that:

1. A true switching threshold exists only for Phase III.
2. Phase III is stable only in a temperature range above room temperature at atmospheric pressure.
3. A uniaxial compressive stress shifts the stable range down.
4. The critical switching voltage decreases with decreasing thickness.
5. The switching time decreases with decreasing thickness.

Research utilizing another ferroelectric material, bulk barium titanate, points out that switching times are related to cell thickness by the following relationship: $t_s = d/E - E_c$ where $d$ = thickness of dielectric $E_c$ = switching threshold field strength $E$ = applied field.

If this equation can be related to Phase III potassium nitrate ferroelectric devices, it is reasonable to assume that to achieve fast switching times the ferroelectric capacitor dielectric should be very thin. The present invention is primarily concerned with obtaining a stable Phase III potassium nitrate thin film dielectric at standard temperature and pressure, and achieving fast switching times with such a thin film dielectric.

Figure 4:
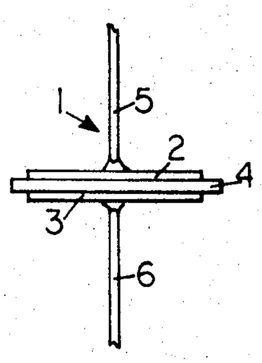
FIG. 4 shows a ferroelectric capacitor memory cell according to a first embodiment of the present invention.

FIG. 4 illustrates a ferroelectric device according to the present invention in the form of a capacitor memory cell 1. Geometrically the memory cell 1 is a capacitor with upper and lower metal electrodes 2 and 3 and the ferroelectric material as the dielectric layer 4. Conductors 5 and 6 are electrically and mechanically connected to the upper and lower metal electrodes 2 and 3, respectively. Fabrication of this cell 1 utilizing vapor deposition techniques will be described in detail hereinbelow.

In accordance with the present invention, ferroelectric devices having a potassium nitrate layer which is less than 1 micron thick are achieved. Fabricating a multilayer device which includes metal layers can be accomplished utilizing high vacuum deposition techniques. Film or layer thickness, an important parameter in this invention, may also be controlled with high vacuum methods.

Figures 5A, 5B, 5C:
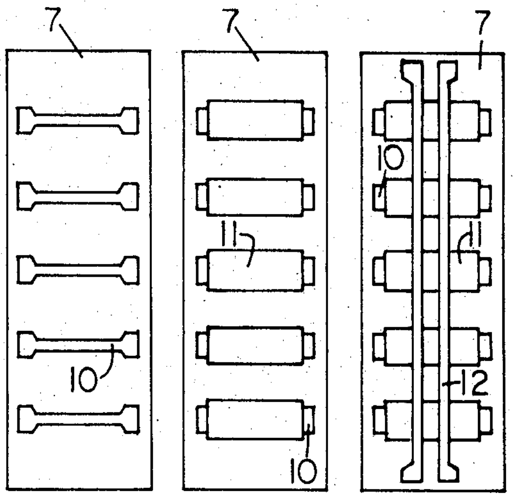
FIGS. 5A, 5B, and 5C illustrate various process steps in forming the deposition layers for the novel ferroelectric device according to a second embodiment of the present invention.

In one embodiment of the invention, the cells fabricated were high vacuum deposited in groups of ten according to a 2 by 5 matrix pattern illustrated in FIG. 5C. A National Research Corporation vacuum coater Model 3166 was used for the deposition process. Attention is focused on an individual cell since all ten cells in the matrix are identical.

With reference to FIGS. 5A, 5B and 5C, a substrate 7 may be a pyrex glass microscope slide 7.6 centimeters long by 2.54 centimeters wide by 0.1 centimeter thick. Microscope slides may be chosen because of their thermal, electrical, and surface properties.

The substrate 7 may be chemically cleaned with a first wash of acetone to remove grease, and a second wash of grain alcohol to remove any chemical film left after the acetone wash. The substrate 7 is then attached to an aluminum heater block 9 (FIG. 7), which in turn is mounted to a carriage on a substrate transport mechanism (not shown). A third cleaning process takes place in the vacuum chamber 8 (FIG. 6) over a range of 200 microns to 25 microns of pressure using a high voltage electric discharge in a predetermined gas, such as a cold, dry nitrogen gas atmosphere. It is very important that the substrate surface is rigorously cleaned. When a material is vacuum deposited upon this surface, a molecular bond is established between the deposited material and the substrate 7.

In thin films the mechanical stresses present are in many cases higher than the yield stresses for the bulk material. A good molecular bond prevents the film from yielding or peeling from the substrate 7.

The substrate transport mechanism provides a linear motion for positioning the substrate 7 over the three masks, (not shown) and a blank is left for an in situ test position while under vacuum if so desired. The masks are positioned in slots on the mask carriage so they may be easily changed, and the entire mask carriage assumbly can be displaced away from the substrate 7 before advancing the substrate 7 to the next position. This is desirable to avoid damaging the thin film deposition. A mechanical gate mounted to the bottom of the mask carriage assembly provides a means of controlling the deposition time.

Figure 7:
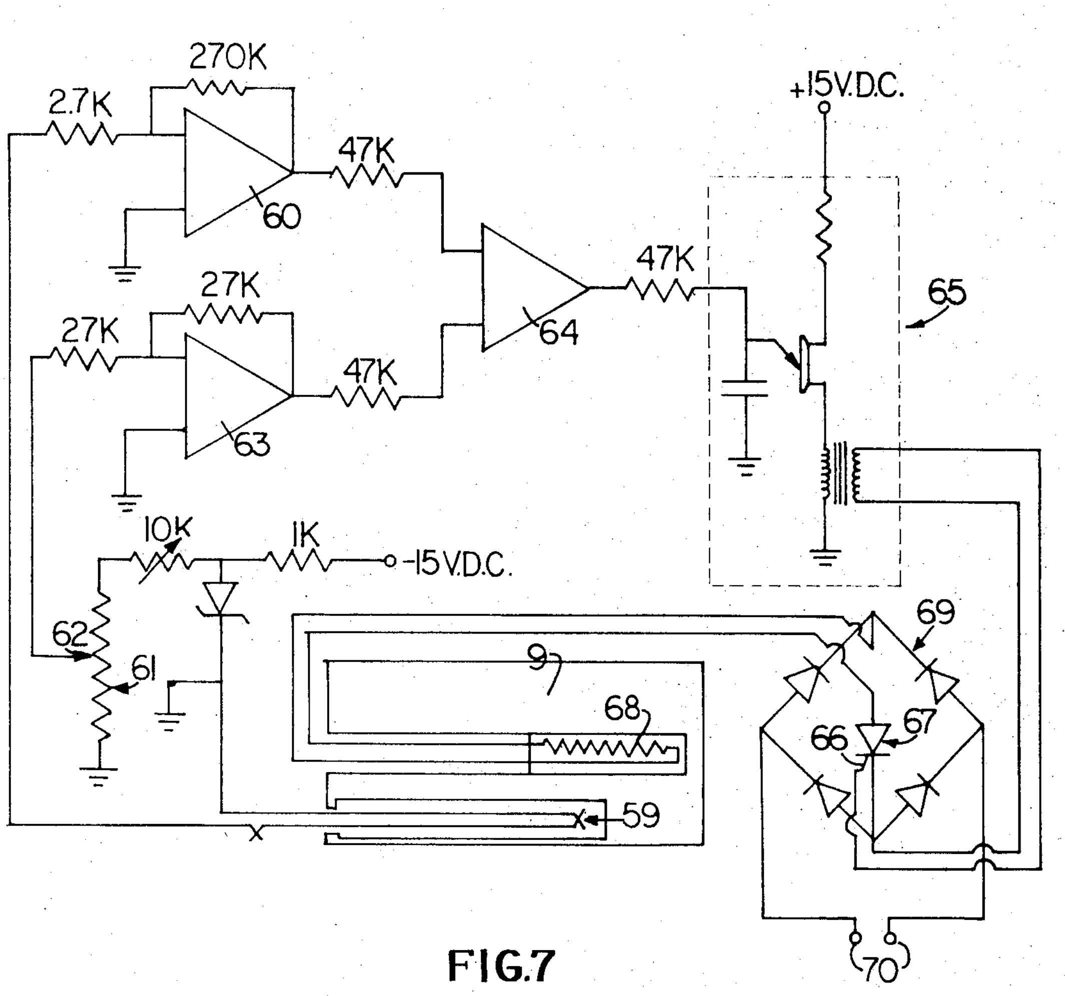
FIG. 7 depicts a block diagram of a temperature controller used in carrying out the novel process according to the invention.

After the substrate 7 is cleaned by ion bombardment, the high voltage is switched off and the substrate heater is brought up to 100° C by means of an electronic temperature controller which is described hereinbelow in connection with FIG. 7.

The temperature of the substrate 7 appears to be critical during the deposition of the potassum nitrate. An elevated temperature provides a better silver-substrate bond, although various other metals can be used for the first electrical contact including other noble metals. A range of 80° to 120° C yielded the best results.

Figure 6:
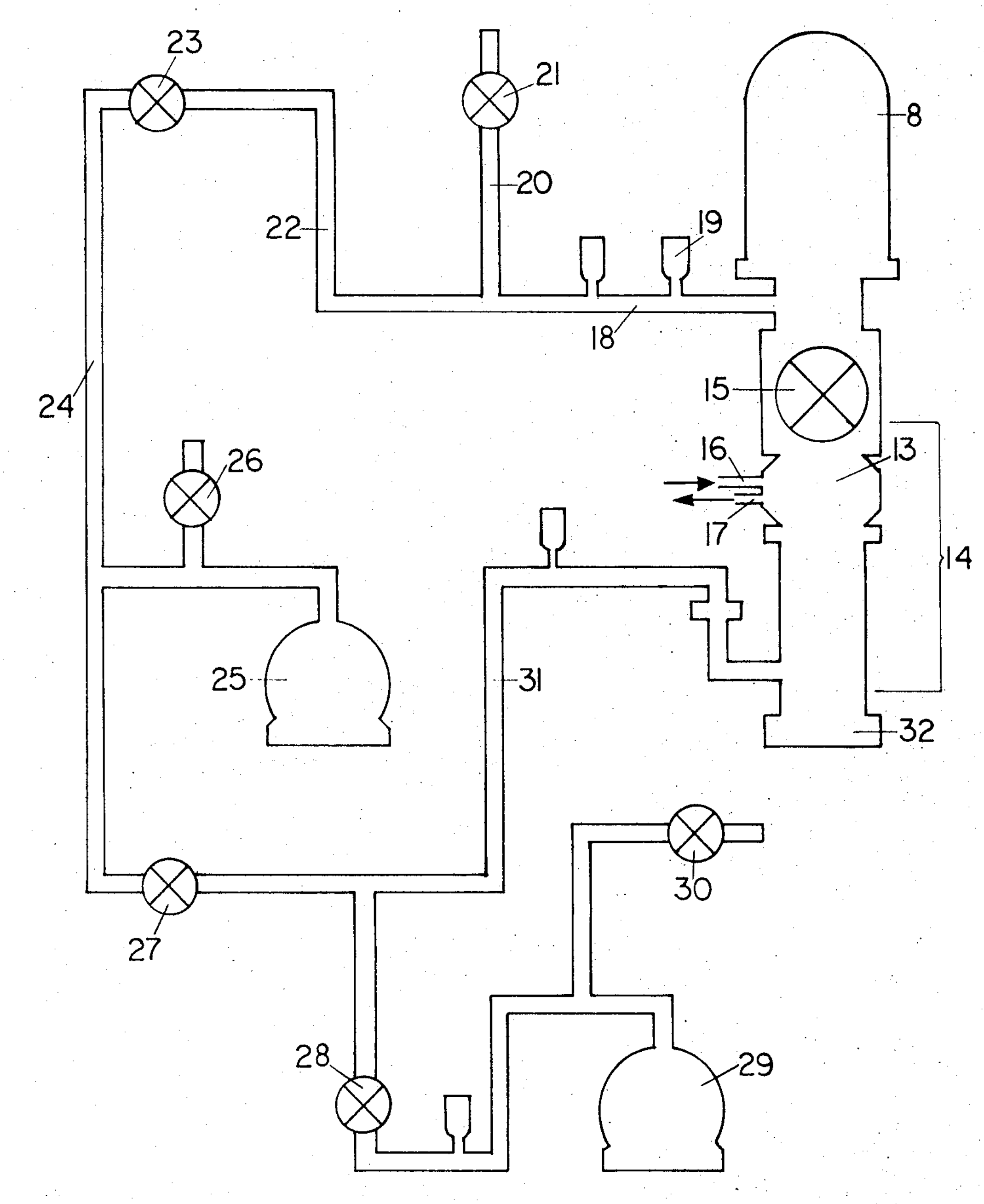
FIG. 6 illustrates a schematic of the vacuum system employed in carrying out the novel process according to the present invention.

FIG. 6 illustrates a schematic of the vacuum system which includes a vacuum chamber 8 connected to a vacuum chamber exhaust manifold 14 through a main vacuum gate valve 15. A cold trap 13 is disposed in the throat of the vacuum chamber exhaust manifold 14. The cooling coils of the cold trap 13 have an inlet 16 and an outlet 17.

A conduit 18 including an ion gauge 19 communicates with the vacuum chamber 8. A conduit 20 connects a chamber air release bellows valve 21 to conduit 18. A conduit 22 connects a roughing bellows valve 23 to conduit 18. A conduit 24 connects the roughing bellows valve 23 to a roughing pump 25, an air release bellows valve 26, and a foreline bellows valve 27. The foreline bellows valve 27 communicates with a holding bellows valve 28 which in turn is connected to a holding pump 29 and an air release bellows valve 30. A conduit 31 connects the foreline bellows valve 27 and the holding bellows valve 28 to a diffusion pump 32 disposed in the lower portion of the vacuum chamber exhaust manifold 14.

While the substrate 7 is heating, the vacuum chamber 8 is pumped down to approximately $10^{-6}$ millimeters of mercury. When the substrate 7 reaches 100° C, it is positioned over the lower electrode mask and a tantalum "boat" (evaporant holder) previously loaded with a few grams of high purity silver is elevated to approximately 1200° C by resistance heating. The gate is removed and silver vapors are allowed to deposit through the lower electrode mask on the substrate 7 as five horizontal rows 10 which are 0.158 centimeters wide (FIG. 5A).

Thickness of the lower electrode 10 is not too critical, but should not be so thick that it peels from the substrate 7. Because the grain size of the silver is a function of several parameters including thickness and because hetero epitaxy may play an important role in the orientation of the potassium nitrate deposition, the thickness and the electrode material may be important.

Silver was chosen for the lower electrode 10 primarily because of its good thin film conductivity, ease of evaporation, and its relative inertness to potassium nitrate vapor.

When the desired thickness of the lower electrode or contact 10 is achieved (deposition thickness is a function of "boat" temperature, vapor pressure, substrate temperature and time), the gate is placed between the "boat" and the substrate 7. The resistance heater is switched off, and the tantalum "boat" is allowed to cool.

Having completed the lower electrode deposition, the aluminum heater block 9 and substrate 7 are advanced to the dielectric mask. This mask is cut to provide an overlap of the lower electrode 10 by 0.19 centimeters on either side, thus preventing shorted cells when the second electrical contact or upper electrode is deposited (see FIGS. 5B and 5C).

The procedure necessary to obtain a stable room temperature and pressure Phase III potassium nitrate deposition or layer 11 is critical. With the substrate temperature held at 100° C, the previously prepared reagent grade potassium nitrate is slowly heated to its melting point (334°C). With a hard vacuum, a cold trap 13 (FIG. 6) for condensing moisture, and radiation heating, the conversion from powder to liquid can be accomplished in approximately one-half hour. The rate of temperature increase should be slow to allow trapped moisture and gasses to evolve from the powdered potassium nitrate. Otherwise gas pockets cause small "explosions" to occur, scattering the potassium nitrate prior to reaching its melting point. The powdered potassium nitrate is placed on a pyrex microscope slide and is mounted 1.0 centimeter above a carbon cloth resistance heater. This arrangement provides radiation heating to evaporate the potassium nitrate.

Direct heating with a tungsten "boat" yields a violent thermal chemical reaction between the molten potassium nitrate and the tungsten. Direct heating with a tantalum "boat" causes the previously mentioned gas pocket problem due to localized heating. Radiation heating appears to work the best of the aforementioned methods. Other methods for potassium nitrate evaporation may be advantageous such as radio frequency sputtering or electron beam heating.

When all of the potassium nitrate is in the liquid state, the temperature of the carbon cloth heater is raised to 770° C. Chamber evacuation is continued to about $10^{-7}$ millimeters of mercury. To obtain $10^{-7}$ millimeters of mercury, liquid nitrogen is passed through cooling coils of the cold trap 13 (FIG. 6) installed in the throat of the vacuum chamber exhaust manifold 14. In addition to condensing moisture vapors, some cryopumping also takes place providing a faster pump-down to the ultimate desired pressure and a lower ultimate pressure.

At $10^{-7}$ millimeters of mercury the gate is withdrawn, and the potassium nitrate is allowed to deposit over the silver or lower electrode 10 for 2 to 4 minutes. The ultimate thickness of the potassium nitrate dielectric layer 11 will depend on the pressure, the temperature of the substrate 7, the temperature of the molten potassium nitrate, and the time of the deposition.

Crystal size and grain orientation, in addition to many other variables, are also a function of the deposition rate and a slow rate of deposition appears to yield the best results.

Two or 4 minutes of deposition time produces the required dielectric thickness, i.e., a maximum of 110 microns. The deposition is terminated by closing the gate and removing power from the carbon cloth heater. Power is then removed from the heater block, the main vacuum gate valve 15 to the vacuum chamber 8 is closed, and cold, dry nitrogen gas from the liquid nitrogen tank (not shown) is allowed to fill the chamber 8 to a pressure of one atmosphere.

At this point it is appropriate to digress from the procedure to discuss the stability phenomenon of the thin film potassium nitrate. Stable Phase III potassium nitrate has been and is obtained according to the present invention without the aid of quenching.

Figure 11:
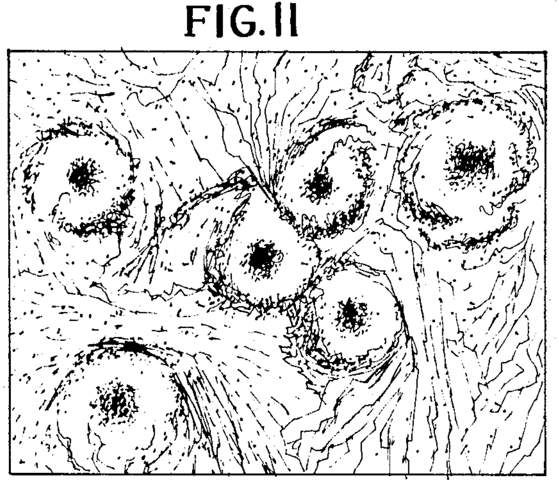
FIG. 11 illustrates an unusual crystalline pattern of potassium nitrate discovered during the investigation leading to the present invention.

It is also interesting to note that this invention has produced an unusual swirling crystalline pattern (FIG. 11) which does not conform to the usual optical patterns for bulk Phase I, Phase II, or Phase III potassium nitrate. The pattern has only been viewed optically and is produced by a set of unusual deposition conditions.

Optical observation and electrical measurements do confirm a stable room temperature and pressure Phase III potassium nitrate. However, heretofore, it was thought that only Phase III bulk potassium nitrate was stable. However according to the present invention it has been found that the non-bulk Phase III crystallinic thin films of the present invention are stable for at least nine months and show no visible signs of conversion or deterioration.

An important aspect of thin films is that the thin film physical properties of a given material may differ substantially from the bulk physical properties of the same material.

Figure 12:
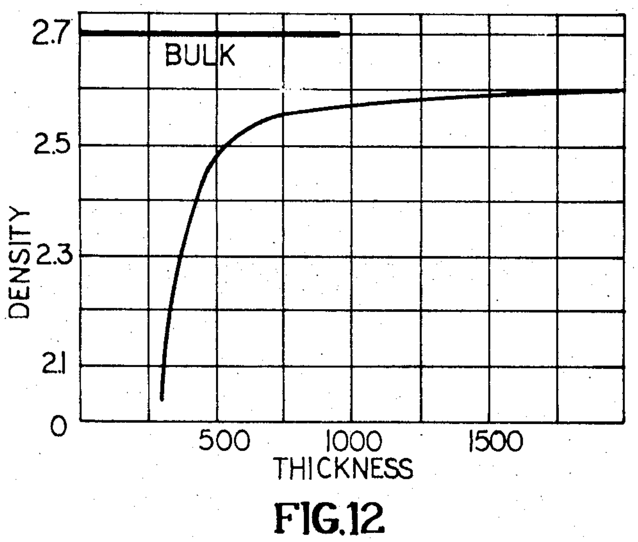
FIG. 12 illustrates a graph showing the density versus thickness for aluminum.

Although the crystal structure of thin films will be the same as the crystal structure of the bulk material, the structural order of the thin film will differ appreciably from the bulk material. The new structures attributable solely to the thin film phenomenon acquire various forms such as amorphous, superstructures, metastable, unstable, and stable polymorphs. The density of a material may also depart drastically from bulk values as the film thickness passes below some critical value. For example, the graph in FIG. 12 illustrates the density versus thickness for a thin film of aluminum. In FIG. 12 the horizontal axis represents the thickness in angstrom units and the vertical axis represents the density in grams per cubic centimeter. The upper horizontal straight line in FIG. 12 at the 2.7 density position represents the plot for bulk aluminum. The lower curve in FIG. 12 represents thin film aluminum.

The lattice constants of thin films in some cases show a definite departure from that of the bulk value. Surface atoms of a crystal in equilibrium have a different environment than atoms in bulk. The atomic arrangement of the surface will be significantly different than the bulk value. Experiments show that a spherical crystallite of diameter D and surface energy $\sigma$ has an internal pressure equal to 4 $\sigma$/D. The lattice spacing $a$ should be changed by $\Delta$ a according to:

$$(\Delta a)/a = (-\tfrac{3}{4})(\sigma/ED)$$

where $E$ is the bulk modulus of the material. An increase or decrease in the lattice constant would depend upon the sign of $\sigma$.

Figures 13, 14, 15:
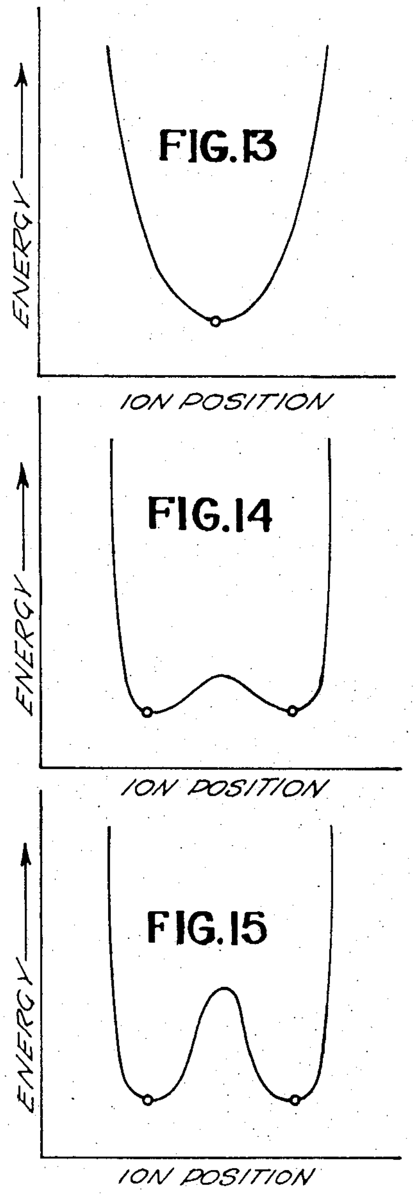
FIG. 13 illustrates a curve representing the energy versus the stable ion position within the potassium nitrate unit cell where the ion is in the X–Y plane.
FIG. 14 shows a curve representing energy versus the stable ion position within the potassium nitrate unit cell where the ion is slightly out of the X–Y plane.
FIG. 15 illustrates a curve representing energy versus the stable ion position within the potassium nitrate unit cell where the ion is still further out of the X–Y plane.

A change in the lattice spacing of the potassium nitrate ion will, in general, cause the free energy of the unit cell (FIG. 2) to change and have an appreciable effect upon the phase stability of the material. In addition to changing the phase stable region, the potassium nitrate ion shift will change the magnitude of the electric field necessary to move the ion from one stable position to the other. FIGS. 13, 14 and 15 show the curves of energy versus stable ion position within the unit cell of potassium nitrate. In each of these three figures, the horizontal axis represent the ion position, and the vertical axis represents the energy. In FIG. 13 the ion is in X–Y plane; in FIG. 14 the ion is slightly out of the X–Y plane; and in FIG. 15 the ion is further out of the X–Y plane.

Certainly quenching may play a role in the stability phenomenon since it creates very high stresses, but the present invention reveals that quenching need not be the determining factor in phase stability, although it may aid and add to the total stable range. Once formed, the thin film structures are normally stable with aging. The critical thickness up to which such structures still exist may be several microns.

It is important to note that this phenomenon is partially attributable to thin film characteristics, and may not be observed in bulk materials. Also, it is believed that the very high compressive stresses imposed and inherent in the thin film phenomenon may be the mechanism by which the phase stability exists.

Having presented a probable mechanism for the phase stability, the fabrication procedure continues.

Allowing the chamber 8 to remain at one atmosphere in cold, dry nitrogen gas for approximately 15 minutes should cause complete conversion of the Phase I potassium nitrate to Phase III.

The chamber 8 is again evacuated to $10^{-6}$ millimeters of mercury and the substrate heater block assembly is advanced to the upper electrode mask. This mask is positioned over a tungsten wire basket previously loaded with a few grams of high purity aluminum. The tungsten filament is elevated to 1000° C, the gate is removed, and aluminum is allowed to deposit over the dielectric layer 11 as two vertical columns 12 which are 0.158 centimeter wide (FIG. 5C).

Experimental results show that aluminum provides the best yield of workable short-free cells, as opposed to using silver, copper, lead, or lead-tin as the upper electrode 12.

Possible explanations of the shorting mechanism may be:

1. Elevated temperature of "boat" necessary to vaporize higher melting point metals releases vapor with a higher kinetic energy, diffusing the metal into the dielectric film 11.
2. Grain size of the metal may be small enough to penetrate the grain boundaries of the potassium nitrate.
3. Mobility of the metal may be too high causing excessive movement of the metal across the dielectric surface 11 prior to the onset of nucleation.

Excluding the shorting problem, the criterion for upper electrode thickness is essentially identical to the lower electrode.

When the desired electrode thickness has been obtained, the evaporation gate is closed and power is removed from the tungsten wire basket. The matrix of completed cells may either by advanced to the test position while the chamber 8 (FIG. 6) is still evacuated, or the master gate valve 15 can be closed and the chamber 8 backfilled to atmospheric pressure so the cells can be removed for testing. The complete 2 by 5 cell matrix is shown in FIG. 5C.

Completed arrays of cells may be optically tested using a Nikon microscope with a type R differential interference attachment to determine the phase of the potassium nitrate. Well-defined grain boundary polycrystalline patterns distinguish between Phase I, Phase II and Phase III potassium nitrate.

The single crystal linear dimension size of the Phase III varies with many deposition parameters, and no attempt has been made to achieve a given size or to obtain a uniform size over a given area. Linear dimensions vary from 0.01 centimeter to 0.00039 centimeter.

In addition to verifying the presence of Phase III potassium nitrate, each cell is inspected for short circuits. Assuming that the upper electrode deposition did not diffuse through the dielectric layer 11 or through the dielectric grain boundaries, short circuits can occur due to misalignment of electrodes 10 and 12 or scratches and imperfections in the dielectric surface. Cell defects of this nature are readily visible using the Nikon microscope with 50 diameter to 400 diameter magnification. Also, the presence of "C" or "A" domain alignment (FIG. 1) can be quickly determined with a slight modification of the microscope.

When the presence of Phase III potassium nitrate has been optically verified, the matrix of cells is placed on a temperature controlled aluminum block. Small springs soldered to tie points provide electrical connection to the deposited electrodes 10 and 12 of the cells.

Figure 16:
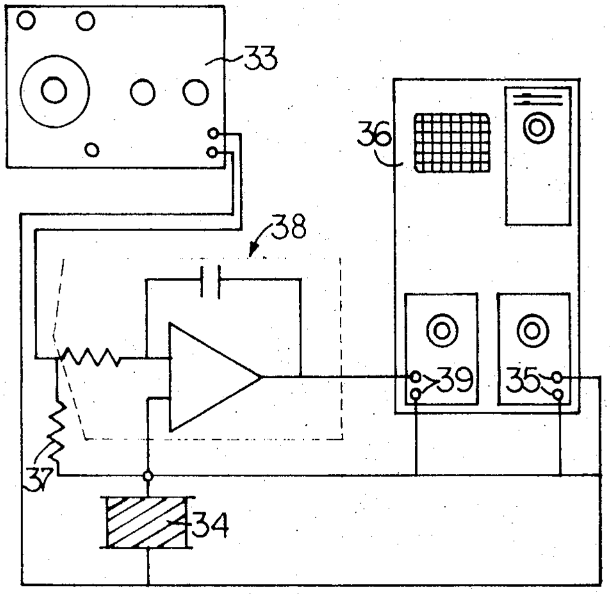
FIG. 16 depicts a circuit employed for obtaining the hysteresis loop of the ferroelectric devices according to the present invention.
Figure 17:
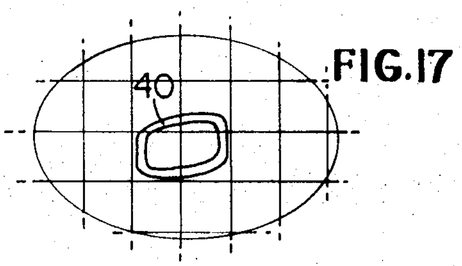
FIG. 17 illustrates a minor hysteresis loop obtained by testing a ferroelectric device made in accordance with the present invention.

A common electrical test method is to observe ferroelectric hysteresis or a charge-versus-voltage curve cycled through positive and negative values of applied voltage as described above in connection with FIG. 1. FIG. 16 shows a circuit for obtaining the hysteresis loops. A sinusoidal generator 33, such as a Hewlett Packard function generator Model 3300A, provides a variable amplitude and low frequency alternating current source. Charge-versus-voltage loops are obtained by applying the voltage across the cell 34 directly to the horizontal input 35 of a storage oscilloscope 36. A voltage proportional to the current through the cell 34 is developed across a small resistor 37, such as a 100 ohm resistor, in series with the cell 34 and the generator 33. This voltage is integrated with an operational amplifier integrator 38, and the waveform thus obtained is applied to the vertical input 39 of the storage oscilloscope 36. Utilizing this technique, several minor loops were obtained, such as the minor loop 40 shown on the oscilloscope trace in FIG. 17.

Figure 18:
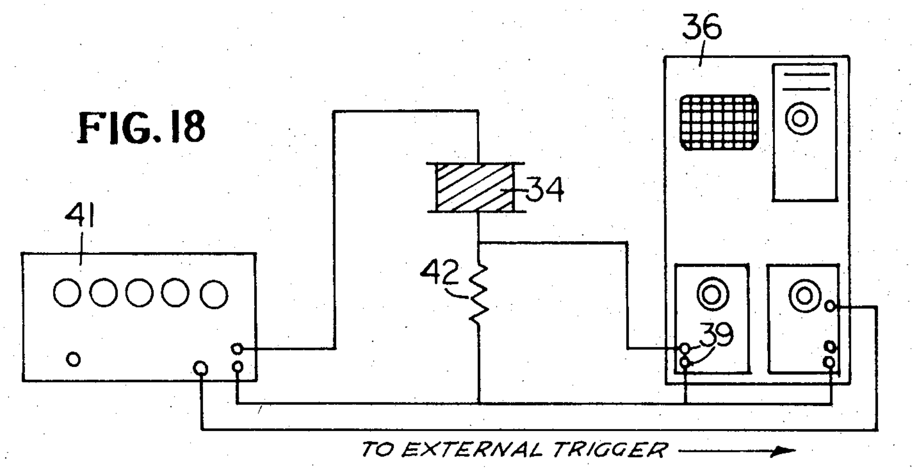
FIG. 18 illustrates a circuit for obtaining the switching properties of the ferroelectric device made in accordance with the present invention.

To determine the switching properties of the cell 34, a pulse test method was used. With reference to FIG. 18, a pulse generator 41 and the cell 34, together with a 100 ohm resistor 42, form a series circuit. The stored information in the cell 34, i.e., +Q or −Q, is read as a voltage versus time by applying the voltage developed across the 100 ohm resistor 42 to the vertical input 39 of a storage oscilloscope 36. Manual triggering with pulse delay of the generator 41, and external triggering of the oscilloscope 36 allows the entire switching waveform to be conveniently recorded.

Assuming the cell 34 has a stored "one" or $+Q_R$, a negative pulse with an absolute value greater than $-V_{cr}$ applied to the cell 34 will cause a polarization reversal. The change in charge equal to $2Q_R$ will cause a current $i_{(t)} = (dg)/dt$ to flow through the 100 ohm resistor 42.

Conversely, if the cell 34 has a stored "zero" or $-Q_R$ and a negative pulse with an absolute value greater than $-V_{cr}$ is applied to the cell 34, there will be only a small change in polarization and hence a small $i_{(t)}$ through the resistor 42.

Figure 8:
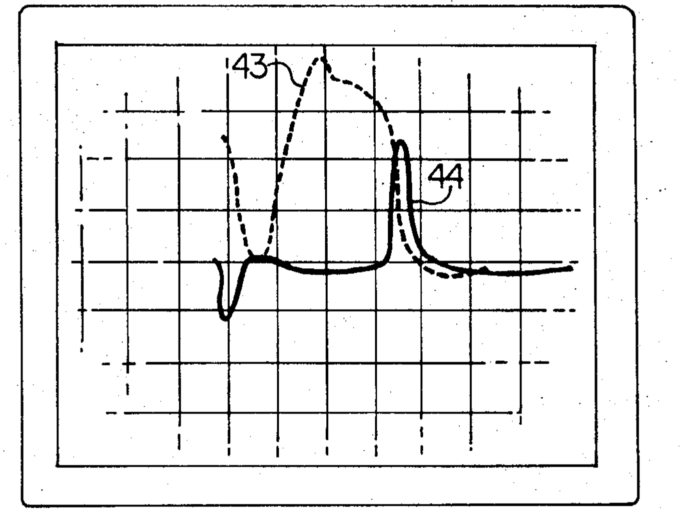
FIG. 8 shows switching waveforms obtained with a ferroelectric device made in accordance with the present invention.

FIG. 8 shows a waveform 43 for reading a stored "one," and a waveform 44 for reading a stored "zero." The switching time ($t_s$) is 210 microseconds, and the peak output pulse amplitude is 800 millivolts. In FIG. 8, the horizontal scale is 50 microseconds for each centimeter and the vertical scale is 200 millivolts for each centimeter.

A relatively quick and simple method of drying and evaporating reagent grade potassium nitrate powder was arrived at experimentally. This method yields a good dielectric film 4 or 11. A novel method for repetitively obtaining a stable room temperature and pressure Phase III potassium nitrate has been discovered empirically. Phase III potassium nitrate has been optically and electrically verified. An unusual crystalline pattern (FIG. 11) has also been optically observed.

Optical examination of virgin thin film Phase III potassium nitrate with crossed polaroid lenses reveals "C" and "A" domain alignment, rather than "C" or "A" domain alignment. Alignment does not appear to follow any predictable pattern and is about 50 percent "C" domain and 50 percent "A" domain.

Minor hysteresis loops 40 have indicated the ferroelectric phase, and have excellent square loop characteristics.

Figure 9:
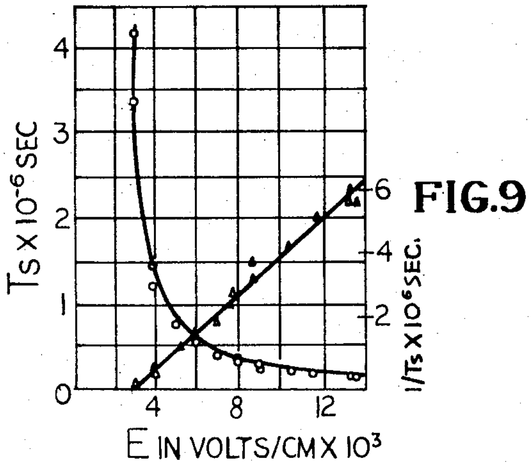
FIG. 9 shows curves illustrating the switching speed versus the applied field in the ferroelectric devices made in accordance with the present invention.

The long switching times observed are attributable to the inability to saturate the cell 34 with a single pulse. For barium titanate, with E less than $E_C$, switching occurs but switching time becomes very long. FIG. 9 illustrates switching speed versus applied field. The electrode interface and the inability to saturate with a single pulse may be interrelated.

FIG. 8 also shows that if the cell output for reading a stored "one" is strobed for maximum amplitude, the "one" to "zero" output ratio is very large.

One of the thin film cells indicated that there is some possibility of non-destructive read-out utilizing the $t^*$ partial switching phenomenon. This particular cell was saturated. Then the polarity of the pulse generator was reversed, and the duration of the pulses reduced. Application of the narrower pulses resulted in a significant read-out waveform, but did not cause any noticeable polarization reversal. This phenomenon has been observed in just one cell.

Figure 10:
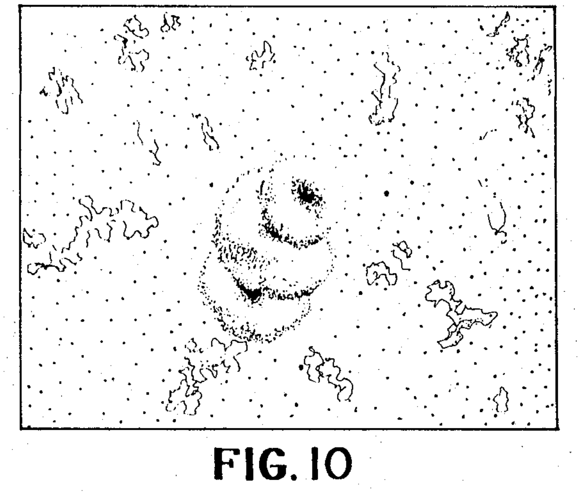
FIG. 10 illustrates a self-healing phenomenon uncovered during the investigation leading to the present invention.

Pulse testing also reveals a self-healing property. Cells subjected to dielectric breakdown potentials recovered to normal operation when left standing for a few minutes. The mechanism is attributable to the thin film phenomenon, i.e., the large stresses present in the upper electrode 2 or 12. When dielectric breakdown or "punch through" occurs, the bond between the dielectric layer 4 or 11 and the upper electrode 2 or 12 at the "punch through" and a portion of the surrounding area is broken. The upper electrode metal peels away from the conducting path. The effect is illustrated in FIG. 10. Notice the circular areas where the upper electrode film has peeled from the center conducting path.

The thin film technique of the present invention holds great promise for fast, high-packing density, non-volatile, non-destructive read-out memories.

Some of the equipment employed to achieve the present invention will be described briefly with reference to FIGS. 7, 8, 9 and 10. The temperature of the substrate heater and test block is adjustable to any preset value between 20° and 200° C. This is accomplished by an electronic temperature control system, the block diagram of which is shown in FIG. 7. The following discussion refers to the block diagram of FIG. 7.

The temperature sensing element is a chromel-alumel thermocouple 59 with a second chromel-alumel thermocouple as the reference junction. For the above temperature range, thermocouple voltage varies from 0.8 millivolts to 8.13 millivolts. The thermocouple voltage is applied to the input of a direct current amplifier 60 with a fixed gain of 100. A reference voltage (1 volt direct current) is applied across a 10-turn potentiometer 61. The voltage from the movable contact 62 is applied to a direct current amplifier 63 with a fixed gain of 1. Outputs from amplifiers 60 and 63 are inputs for amplifier 64 which has an open loop voltage gain of approximately 60,000. Amplifier 64 operates as a voltage comparison amplifier, and the output is plus or minus 15 volts direct current depending upon the polarity of the inputs.

When the temperature of the aluminum heater block 9 is below the set point indicated, the output of amplifier 64 is at plus saturation (plus 15 volts direct current). The output of amplifier 64 is applied to a unijunction transistor triggering circuit 65 which provides rapid pulses to the gate 66 of a silicon control rectifier 67 when amplifier 64 output is positive. The silicon control rectifier 67 is in series with and controls the current through a resistance heating element 68 mounted in the aluminum heater block 9. Current is supplied to the heater-silicon control rectifier circuit by an unfiltered diode bridge rectifier connected to the 110 volt alternating current line 70.

When the temperature of the aluminum heater block 9 is at or above the set point, the output of amplifier 64 is at negative saturation (minus 15 volts direct current). With minus 15 volts direct current applied to the input of the unijunction triggering circuit 65, triggering pulses for the gate 66 of the silicon control rectifier 67 are no longer generated. Hence, the silicon control rectifier 67 does not conduct and no current flows through the resistance heating element 68.

Actual temperature measurement is accomplished by displaying the thermocouple amplifier 60 voltage on a meter and referring to a thermocouple table. Meter scale divisions and dial indicator divisions are read in millivolts so that other thermocouple combinations may be used to extend or change the temperature range of the controller. Absolute temperature accuracy is limited to the thermocouple 59 and reference junction accuracy; however, any given value within the range of the instrument may be maintained within 0.2° C of the set point.

While the present invention has been particularly shown and described with reference to preferred embodiments, it will be understood by those skilled in the art that changes and modifications in form and details may be made without departing from the spirit and scope of the present invention.

I claim:

1. A ferroelectric device comprising, in combination:
a ferroelectric potassium nitrate layer having a thickness of less than 110 microns; and
electrical contacts disposed on predetermined surface areas of said ferroelectric potassium nitrate layer.

2. A ferroelectric device characterized in accordance with claim 1, wherein said thickness of said ferroelectric potassium nitrate layer falls within a range of from 100 angstrom units to 1,000 angstrom units.

3. A ferroelectric device characterized in accordance with claim 1, wherein at least one of said electrical contacts comprises an electrode formed from a metallic substance containing at least some aluminum.

4. A ferroelectric device characterized in accordance with claim 1, wherein said ferroelectric potassium nitrate layer has a thickness of less than 1 micron and comprises Phase III potassium nitrate which is stable at standard temperature and pressure.

5. A ferroelectric device characterized in accordance with claim 1, wherein one of said electrical contacts is comprised of material which includes at least some silver, and wherein another of said electrical contacts is comprised of a material which includes at least some aluminum.

* * * * *